United States Patent Office 3,025,161
Patented Mar. 13, 1962

3,025,161
METHOD OF FORMING PATTERNS

Thaddeus Victor Rychlewski, Seneca Falls, N.Y., assignor, by mesne assignments, to Sylvania Electric Products, Inc., Wilmington, Del., a corporation of Delaware No Drawing. Filed June 27, 1955, Ser. No. 518,360
5 Claims. (Cl. 96—35)

This invention relates to a method of producing phosphor patterns and more particularly to a method of producing a tri-color phosphor screen for a color television picture tube.

Known methods for producing phosphor screens for tri-color television tubes usually employ a photo printing technique. In these prior methods a first color phosphor is usually mixed with photo sensitive material and deposited on the screen in the form of a slurry. Another well known method of applying the phosphor invokes the phosphor settling process as used in black and white tubes, followed by a coating of photo sensitive material. After deposit, the material is dried and exposed to light through an aperture mask to sensitize the exposed portions, and the pattern is then developed by washing the screen with deionized water. The second and third phosphor patterns are subsequently formed in the same manner to produce a complete tri-color picture tube viewing panel.

The aforementioned processes have the disadvantages of requiring costly equipment, lengthy processing procedures, and substantial phosphor waste.

It is therefore an object of the invention to reduce the aforementioned difficulties.

Another object of the invention is the provision of a method of forming phosphor patterns which is adaptable for automatic production and which minimizes phosphor material waste.

Another object of this invention is to provide a method which produces thick phosphor patterns on the viewing panel of a color television picture tube and minimizes cross color contamination.

The aforementioned objects, in addition to other objects which will be apparent upon reading the following description, are achieved in one aspect of the invention by a method wherein the phosphor is deposited in a dry powdered state onto a clear layer of moist photo sensitive material while the material is still in a tacky condition, and the pattern is subsequently formed by exposing and developing operations.

In detail, a method of forming a phosphor pattern such as an array of red, green, and blue phosphor configurations on a color television picture tube viewing panel in accordance with one embodiment of the invention utilizes the application of a clear radiant energy sensitive material, such as the light sensitive substance, polyvinyl alcohol, sensitized with ammonium dichromate, to the panel of the picture tube. If desired, the polyvinyl alcohol may have mixed with it or suspended in it a phosphor of the type which will be later applied in dry form as described below. This material may be applied by flowing, spraying, or any other well known operation. The radiant energy sensitive material is then partially removed or drained briefly until an even surface is evident. Before the material has dried, and while it is in a moist or tacky state, a uniform screen of dry powdered phosphor such as the commonly used red phosphor, zinc phosphate, is sprayed or otherwise deposited on the tacky radiant energy sensitive material. This material is then dried and the layer is subsequently exposed to a radiant energy source such as a light source through a negative pattern like a conventional shadow mask. The areas which have been exposed are arranged in accordance with the excitation area, for example, of the red cathode emitter of the tri-color tube. The final step in forming the phosphor pattern is the development operation wherein the entire surface of the panel is washed with a developing fluid such as deionized water. The sensitized or hardened areas remain while the unexposed or unhardened areas are removed. This entire process is then repeated for each of the other two color phosphors to form a complete tri-color pattern for a color picture tube. Zinc ortho-silicate is the commonly used green phosphor while zinc sulphide is a well known blue phosphor material. These green and blue patterns are arranged on the screen in accordance with the green and blue cathode emitter excitation areas.

Another embodiment of the invention applicable to the formation of phosphor viewing panels for a color picture tube utilizes the application of a clear radiant energy sensitive material to the picture tube panel followed by a drying operation. This dried layer is then exposed to light through the shadow mask and the coated panel is subsequently developed. A second clear layer of radiant energy sensitive material having the same or a similar composition to the previously used material is then deposited on the panel, and while the material is still moist or tacky, the dry phosphor is applied. Drying, exposing and developing operations complete the process of forming the first phosphor pattern. This process is then repeated for the other two phosphors to form the color tube screen. In this embodiment of the invention, it has been found that a good phosphor pattern may be obtained without using either of the first exposure and development steps since the latter exposure and development operations will adequately form the pattern. A satisfactory pattern may also be obtained by including the first exposure operation while leaving out the first developing operation, and thereby enabling the development of both of the unsensitized layers in the final developing step. In addition, if the first exposure operation, but not the first development operation, is made, experiment has shown that the second exposure is not necessary since the second pattern thickness will be adequately affixed to the panel by adhesion.

Application of the dry phosphor material to a moist or tacky radiant energy sensitive surface also provides improved phosphor patterns when a suspension of phosphor in the radiant energy sensitive material is used. This suspension may be deposited on the panel by spraying, flowing, or whirling operations. The coating is dried, exposed and developed, and then a clear, moist radiant energy sensitive material having the same or a similar composition to the previously used material is applied to the panel, followed by a deposit of dry powdered phosphor while the clear radiant energy sensitive material is still in a tacky state. The coatings are subsequently dried, exposed, and developed to form the first phosphor pattern. This process is then repeated for the second and third phosphors to complete the tri-color picture tube screen. It has also been found that the first exposure step need not be used to produce a satisfactory pattern, and if used, it need not be followed by a developing operation since the final exposure and development operations will be sufficient.

It is obvious that many other deviations may be made within the scope of the invention. For instance, any of the previously described embodiments may be repeated as often as necessary to effectively build up the pattern thickness.

Phosphor patterns made in accordance with the invention provide thick patterns, and cross contamination with resulting color impurity is negligible. In addition, there is a minimum of waste of expensive phosphor material other than that which is normally developed out to form the pattern, since the phosphor powder not attached to the tacky radiant energy sensitive surface is easily removed by any convenient means such as a vacuum device.

While there have been described what are at present considered to be the preferred embodiments of the invention, it will be apparent to those skilled in the art that various changes and modifications may be made therein without departing from the scope of the invention as defined in the appended claims.

What is claimed:

1. A method of forming a phosphor pattern on the viewing panel of a cathode ray tube comprising the steps of coating said panel by liquid application and removal of any excess of a light hardenable substance to form a continuous clear uniform moist tacky layer of said light hardenable substance on said panel, applying a dry powdered phosphor uniformly to said entire layer while said substance is still in a tacky condition to cause adherence thereto, drying said phosphor powder adhered tacky layer, subsequently exposing portions of the dried phosphor powder adhered layer on said panel to light rays through a pattern negative to mark the pattern, and developing said pattern by washing with a developing fluid to remove the unexposed portions of said layer and the phosphor associated therewith.

2. A method of forming a phosphor pattern on the viewing panel of a cathode ray tube comprising the steps of coating said panel by spray liquid application of a clear light hardenable substance to form a continuous uniform moist tacky layer of said light hardenable substance on said panel, applying a dry powdered phosphor uniformly to said entire layer while said substance is still in a tacky condition to cause adherence thereto, drying said phosphor powder adhered tacky layer, subsequently exposing portions of the dried phosphor powder adhered layer on said panel to light rays through a pattern negative to mark the pattern, and developing said pattern by washing with a developing fluid to remove the unexposed portions of said layer and the phosphor associated therewith.

3. A method of forming a phosphor pattern on the viewing panel of a cathode ray tube comprising the steps of coating said panel with a first continuous clear moist layer of a light hardenable substance, drying said first layer, covering said first layer by liquid application and removal of any excess of said light hardenable substance to form a second continuous clear uniform moist tacky layer of said light hardenable substance on said panel, applying a dry powdered phosphor uniformly to said entire second layer while said substance is still in a tacky condition to cause adherence thereto, drying said phosphor powder adhered tacky second layer, subsequently exposing portions of the phosphor powder adhered layers on said panel to light rays through a pattern negative to mark the pattern, and developing said pattern by washing with a developing fluid to remove the unexposed portions of said layers and the phosphor associated therewith.

4. A method of forming a phosphor pattern on the viewing panel of a cathode ray tube comprising the steps of coating said panel by liquid application and removal of any excess of light hardenable polyvinyl alcohol to form a continuous clear uniform moist tacky layer of said light hardenable alcohol on said panel, applying a dry powdered phosphor uniformly to said entire layer while said alcohol is still in a tacky condition to cause adherence thereto, drying said phosphor powder adhered tacky layer, subsequently exposing portions of the dried phosphor powder adhered layer on said panel to light rays through a pattern negative to mark the pattern, and developing said pattern by washing with water to remove the unexposed portions of said layer and the phosphor associated therewith.

5. A method of forming a phosphor pattern on the viewing panel of a cathode ray tube comprising the steps of coating said panel by liquid application and removal of any excess of a composition containing a light hardenable substance and a phosphor to form a continuous uniform moist tacky layer of said composition on said panel, applying additional amounts of said phosphor in dry powdered form uniformly to said entire layer while still in a tacky condition to cause adherence thereto, drying said phosphor powder adhered tacky layer, subsequently exposing portions of the dried phosphor powder adhered layer on said panel to light rays through a pattern negative to mark the pattern, and developing said pattern by washing with a developing fluid to remove the unexposed portions of said layer and the phosphor associated therewith.

References Cited in the file of this patent

UNITED STATES PATENTS

| | | |
|---|---|---|
| 1,093,134 | Huebner | Apr. 14, 1914 |
| 1,265,641 | Foerster | May 7, 1918 |
| 1,718,945 | Carter | July 2, 1929 |
| 2,078,578 | Lugrin | Apr. 27, 1937 |
| 2,221,474 | Gardner | Nov. 12, 1940 |
| 2,370,330 | Smith et al. | Feb. 27, 1945 |
| 2,568,448 | Hansen | Sept. 18, 1951 |
| 2,769,733 | Pool | Nov. 6, 1956 |
| 2,785,331 | Donahue | Mar. 12, 1957 |

FOREIGN PATENTS

| | | |
|---|---|---|
| 713,908 | Great Britain | Aug. 18, 1954 |

OTHER REFERENCES

Sylvania Technologist, July 1953, pp. 60–63.